Figure 1:
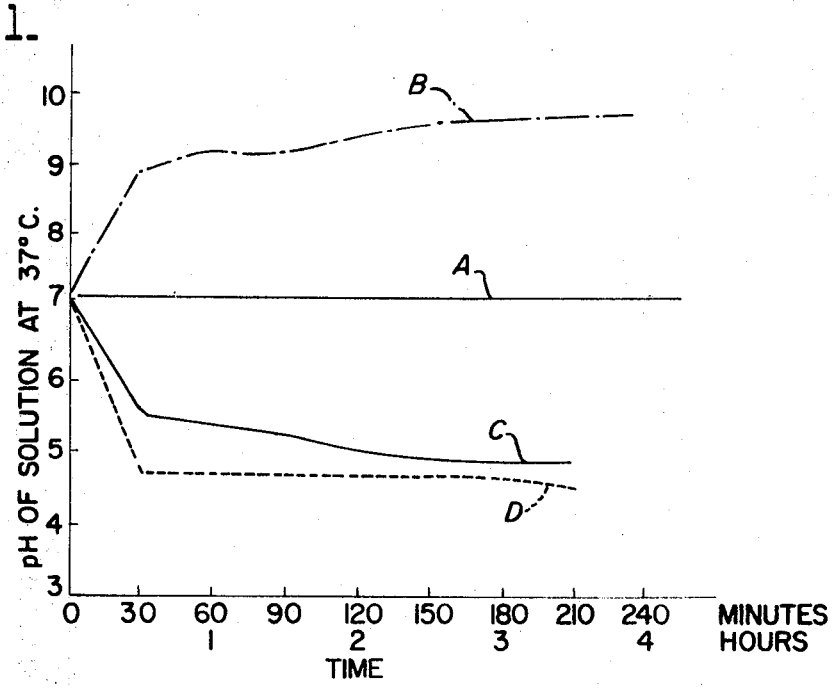

United States Patent

[11] 3,608,086

| [72] | Inventor | Alfred Halpern<br>Great Neck, N.Y. |
|---|---|---|
| [21] | Appl. No. | 795,131 |
| [22] | Filed | Nov. 1, 1968 |
| [23] | | Division of Ser. No. 683,415, June 27, 1967, Pat. No. 3,449,391, which is a continuation-in-part of Ser. No. 287,170, May 24, 1963, abandoned, which is a continuation-in-part of Ser. No. 108,809, May 9, 1961, abandoned |
| [45] | Patented | Sept. 21, 1971 |
| [73] | Assignee | Synergistics<br>Yonkers, N.Y. |

[54] TREATMENT OF DERMATOLOGIC DISEASES EMPLOYING ALUMINUM PROPIONATE ALUMINUM DIPROPIONATE AND CERTAIN DOUBLE ACID SALTS THEREOF
19 Claims, 2 Drawing Figs.

| [52] | U.S. Cl. | 424/317 |
|---|---|---|
| [51] | Int. Cl. | A61k 27/00 |
| [50] | Field of Search | 424/317; 260/448 |

[56] References Cited
UNITED STATES PATENTS

| 2,141,477 | 12/1938 | Losch | 260/448 |
|---|---|---|---|
| 3,449,391 | 6/1969 | Halpern | 260/448 |

OTHER REFERENCES
Hood et al., J.A.C.S. Vol. 72 pp. 2094– 2095 (1950)

Primary Examiner—Albert T. Meyers
Assistant Examiner—Vincent D. Turner
Attorney—Stanley Wolder ABSTRACT: Double acid salts of aluminum propionate and aluminum dipropionate prepared with acetic acid, lactic acid, citric acid and tartaric acid, which are suitable for use in treating dermatologic disease.

INVENTOR
ALFRED HALPERN
BY Stanley Wolder
ATTORNEY

TREATMENT OF DERMATOLOGIC DISEASES EMPLOYING ALUMINUM PROPIONATE ALUMINUM DIPROPIONATE AND CERTAIN DOUBLE ACID SALTS THEREOF

This application is a division of applicant's copending application Ser. No. 683,415, filed June 27, 1967, now patent No. 3,449,391, which in turn is a continuation-in-part of applicant's copending application Ser. No. 287,170, filed May 24, 1963, and now abandoned, which in turn was a continuation-in-part of applicant's copending application Ser. No. 108,809, filed May 9, 1961, now abandoned.

This invention relates to new and novel therapeutic compositions containing the double acid salts of aluminum propionate, aluminum dipropionate, the method of their manufacture, and their use in treating local dermatologic disease. An object of this present invention is to describe pharmaceutical compositions comprising aluminum propionate and aluminum dipropionate and a pharmaceutically acceptable carrier, which are therapeutically desirable for the relief of the symptoms of dermatologic disease. In particular, in concerns the double acid salts of aluminum propionate and aluminum dipropionate prepared with acetic acid, lactic acid, citric acid and tartaric acid, their methods for their use in treating dermatologic disease.

Although a tremendous number of dermatologic drugs have been developed over the past two decades, certain basic dermatologic procedures remained in continued use despite their well-known inherent limitations. Thus, for the therapy of inflamed, exudative and vesicular eruptive stages of dermatitides of almost any origin, soaks, compresses or baths are invariably recommended. Among the more commonly used therapeutic agents for soaks and wet dressings are potassium permanganate, boric acid and aluminum acetate. Aluminum acetate solution, which is also known under its common name as Burrow's solution, has been employed for these purposes for almost a century in spite of the fact that Frazier, (in the Medical Clinics of North America 36:1435, 1952) states that, "there is no proof of therapeutic action of aluminum acetate, As a surface buffer it is of doubtful efficacy. It may very possibly act as an irritant under the circumstances in which it is commonly used. This would need investigation." Apart from the question of doubtful efficacy, Burrow's solution must be freshly prepared and has a tendency to sediment with consequent loss in therapeutic potency.

Inorganic aluminum salts have also been used as antiperspirants and deodorants in cosmetic preparations. This usage is limited to local application of an inorganic acid salt, as for example, aluminum chloride or aluminum oxychloride and it is well known that these preparations give rise to allergenic reactions which have restricted their use to a certain segment of our population who are not sensitive to these agents.

It was found that certain double acid salts of aluminum propionate and aluminum dipropionate possess new and novel properties which make these most desirable for therapeutic use in dermatologic medicine. Furthermore, these new agents do not possess the limitations experienced with the older aluminum salts which require fresh preparation and are of uncertain potency. These new compounds may be formulated into stable aqueous solution, lotions, ointments and powders for use in therapy or they may be dispensed as a dry powder formulations to prepare solutions of different strength to be used as wet dressings and soaks.

Aluminum propionate is a white crystalline powder with a slight aromatic odor which is insoluble in water. It has the empirical formula of $AlC_9H_{15}O_6$ and contains from 1 to 5 molecules of water of hydration. Aluminum dipropionate has the empirical formula of $AlC_6H_{11}O_5$ with 1 to 5 molecules of water of hydration and is a white powder with a slight aromatic odor, insoluble in water.

A method for the preparation of aluminum propionate in a crude form, has been described in British Patent (Great Britain, No. 699,195, Nov. 4th 1953) but no description other than the observation that a compound containing more than 19 percent of aluminum oxide was obtained. It is furthermore noted that the aluminum salts described in the above patent specifications are useful as textile assistants. In 1950, Hood and Ihde, (J.A.C.S., 72, 2094–2095, 1950) investigated the preparation and composition of aluminum propionates in order to resolve the controversy regarding the existence of aluminum tripropionate. In the course of this study, the investigators prepared aluminum dipropionate or aluminum subpropionate, having the elemental formula $AlC_6H_{15}O_5$, and aluminum tripropionate, wit the elemental formula $AlC_9H_{15}O_6$. The compounds were identified by chemical analysis and X-ray defraction patterns, using a nickel filter from a copper target. An exposure time of about 4 hours with a potential of 37.5 kilovolts and a current of 20 milliamperes was used. THe conclusions of these investigators were that the di- or subpropionate of aluminum and aluminum tripropionate, did in fact, exist, although rigid conditions were necessary to avoid hydrolytic decomposition. While the method of Losch (U.S. Pat. No. 2,141,477) was found to be adequate for the preparation of aluminum triacetate, the same procedure did not result in aluminum tripropionate. This is significant in that it demonstrates a difference in behavior between close structurally related compounds to verify a fact long known to the chemist, that while compounds may be closely related in structure, the respective methods of preparation and chemical properties of these compounds may be far apart.

Aluminum propionate and aluminum dipropionate are insoluble in water, but may be dissolved through the aid of either acid or alkaline ions. However, as has been noted by Hood, aluminum tripropionate and dipropionate are subject to hydrolytic decomposition and consequently, these compounds soon decompose in these acid or alkaline solutions.

We have found that under certain conditions aluminum propionate and aluminum subpropionate will react with certain acid compounds to form a double acid salt. Such a double salt is a distinct chemical entity with reproducible physical and chemical properties and with new and novel therapeutic properties. Thus, while aluminum propionate and aluminum dipropionate are insoluble in water, the double acid salt prepared by reacting these compounds and organic acids, such as acetic acid, citric acid, lactic acid and tartaric acid, are soluble in cold water and very soluble in hot water.

A method for preparing the double salts of aluminum was described by Geck (German Pat. No. 533,130, Sept. 9th 1931) in which it was observed that these double salts are insoluble substances. The purpose of the Geck method was to render insoluble, aluminum slats which were soluble. It is emphasized that the significance of the invention of Geck which distinguishes his procedure from that which was previously known, was the process for achieving insolubility through double salt formation. It is interesting to note that so strong was his desire to produce an insoluble compound, that salicylic acid was specifically omitted because it resulted in a soluble salt. The process of Geck for the preparation of insoluble aluminum double salts involves the conversion of soluble basic aluminum acetate or homologous salts of aluminum by organic acids which contain conjugated double linkages, to form difficulty soluble compounds. The only property noted for these compounds apart from color, and physical state, is the insolubility of the compound in water. Older methods describing double salt formation similarly refer exclusively to the water-insoluble properties of the double salts. In fact, some workers have noted that these double salts are even insoluble in dilute acids.

The state of the art indicates that double salts of aluminum with organic acids were previously prepared from both aromatic and unsaturated aliphatic organic acids and these were found to be insoluble in water. It is important to note that Geck and the previous workers who describe double salts of aluminum compounds, all show these compounds to be insoluble in water. This finding was made despite the broad sampling of organic acids which were used to form double salts. Thus, Geck describes both aromatic and aliphatic organic acids containing unsaturated linkages, whereas earlier workers described aromatic and aliphatic acids of both saturated and unsaturated linkages. In contrast to these findings, the products of the present invention are double salts of aluminum and certain organic acids which are extremely soluble in water and are stable, homogeneous and reproducible chemical compounds.

Another distinguishing characteristic between the double salts of the present invention and that of the prior art is the use of di- and tri-basic acids in addition to the monobasic acid. This is of significance in that the double salts formed contain a greater amount of aluminum that would be expected from previous experience with monobasic acids. Furthermore, the use of acetic acid as monobasic acid forming a double salt is of particular interest since this results in an unexpected finding of converting to solubility a double salt of the chemical class which was previously found to be insoluble and therefore could not be predicted from the prior art.

When these new double salts are prepared, it is necessary to use a quantity of organic acid component (viz. acetic acid, citric acid, lactic acid, and tartaric acid) of from 20 to 60 percent by weigh of the molecular weight of the particular double salt desired depending upon the particular organic acid used. THese double salts may be obtained from either aqueous or alcoholic media and are solid crystalline, homogeneous compounds, ranging in color from white to yellow and without disagreeable odor. They have an astringent taste and are not irritating to the skin and mucous membranes. These double salts have a strong antiseptic property as well as enzyme-inhibiting characteristics and exert an anti-inflammatory action to the skin.

Apart from Geck who described a possible therapeutic use for his insoluble aluminum double salts as playing a special role in the treatment of metabolic diseases when taken internally, the older compounds described as being possible double salts of aluminum are noted as having no significance to therapy. A possible exception to this would be the tannic acid double salt which has been described as having disinfectant properties. The well known insolubility of aluminum propionate and aluminum subpropionate is sufficient, according to the prior art, to eliminate these compounds from any therapeutic consideration. In contrast to this teaching, it has been found in the present invention, that aluminum propionate and aluminum subpropionate and their double salts, either alone or in combination with a pharmaceutically acceptable carrier, will exert an advantageous therapeutic effect. Where applied topically, aluminum propionate and aluminum subpropionate and their double acid salts are formulated into therapeutic compositions containing at least 2 percent of the active ingredient although the concentration may range as high as 30 per cent of the active ingredient. This range in concentration is dependent upon the specific therapeutic needs of the patient and also the nature of the pharmaceutical carrier used. Thus, it was found that the lower range in concentration (viz. from 2 to 10 percent) of the active ingredient is the preferred one when aqueous solutions or aqueous phase emulsions are used, while the upper range when nonaqueous or oleaginous vehicles are used. A concentration of 2 to 10 per cent of either aluminum propionate or aluminum dipropionate or their respective double salts was found to be the preferred range of concentration when a dry dusting powder was desired as the pharmaceutical dose form. Larger concentrations of active ingredients are of value in treating specific resistant dermatologic conditions or when the patient's needs specially warrant it and concentrations as high as 30 percent of the active ingredients may be utilized, although it is recognized that these instances will not be common.

Of particular importance is the finding that concentrations of aluminum propionate and aluminum dipropionate or their double acid salts in aqueous solution, of at least 2 percent by weight, and at least 5 percent by weight, is oleaginous bases, causes an inhibition of the urease enzyme system. This enzyme system is of special importance since it converts urea to ammonia and the urease enzyme is demonstrated in a wide range of microbial organisms. The conversion of urea to ammonia has been postulated as the predominant cause of diaper rash, a distressing and commonly observed dermatologic complaint of infants. The treatment of diaper rash until now has been particularly disappointing and has involved the use of antiseptics to sterilize the diapers and the skin, as well as protective ointments and creams. The use of antiseptics to sterilize the diapers is a particularly futile effort because of the continued exposure of the body area and its coverings to its ever present microbes on the skin and in the air. THe use of protective creams and ointments are also of little value since it is virtually impossible to obtain a protective covering which would be impervious to the body fluids and the air. Furthermore, the use of these ointments and creams stains clothing and presents special problems in their laundering.

It was found that the application of aluminum propionate or aluminum dipropionate, or their double acid salts, either as a solution, lotion, ointment or dusting powder, inhibits this special enzyme system, so that the urea of the urine is not converted to ammonia with its consequent maceration of the skin by high alkalinity and thereby avoids the local inflammatory reactions called diaper rash. Thus, a new therapeutic tool is provided to the physician, which approaches the basic problem of an inflammatory skin reaction associated with diaper rash through a new dermatologic mechanism, that of surface enzyme inhibition.

The inhibitory effects of aluminum propionate and aluminum dipropionate or their double acid salts on the overall urease reaction may be utilized to advantage for the control of other inflammatory skin reactions arising from ammonia maceration as, for example, in intertrigo. In this dermatologic manifestation, the bacterial flora of the skin acts upon the nitrogenous secretion of the skin ro release ammonia which, in turn, effects the overall alkalinity of the area. It is well known that normal skin is acid in reaction while inflamed pathologic skin exhibits an alkaline pH. The therapeutic approach to this problem has been to attempt to reverse the high pH reaction of the skin to that of the lower normal physiologic acid range.

It is for this purpose that wet dressings and soaks containing acid solutions are used. However, the application of acid solutions to the skin will not counteract an inherent cause of the inflammatory response but merely neutralize any liberated alkaline substances. It should be noted that the liberation of alkaline, traumatic, pathologic substances is a continuous reaction whereas the neutralization by acid liquid solutions as a compress or a soak is an intermittent phenomenon depending upon a number of variables such as the degree of contact, the buffering capacity of the acid, the volatility of the solution and the frequency of its application. The use of aluminum propionate and aluminum dipropionate or their double acid salts causes no interference with the normal secretory activity of the skin and the healing process is permitted to proceed because the continued insult by alkaline irritants has now been avoided. These principles affecting the skin pH reaction may be applied to a wide range of dermatitides wherein it is desired to return the pH of the skin to the normal acid side.

In addition to the unique and novel property of inhibiting the urease reaction, aluminum propionate, aluminum dipropionate and their double acid salts possess the further advantages of exerting a mild astringent action as well as a broad range antiseptic effect. While these dermatologic properties are by themselves only contributory to the overall therapeutic process, when coupled with the urease inhibitory response of the new compounds a more advantageous therapeutic effect is achieved. The combined dermatologic properties of aluminum propionate or aluminum dipropionate or their double acid salts result in a more rapid and more efficacious return to normal of pathologic deranged skin in such dermatologic entities as atopic dermatitis, contact dermatitis, fungal infections of the skin, allergic dermatitis, and other dermatologic entities, characterized by inflammation.

When it is desired to utilize aluminum propionate or aluminum dipropionate or their double acid salts for these purposes, the appropriate preparation (viz. wet dressing, ointment, lotion or dusting powder) is applied to the affected area from one to six times daily, depending upon the severity of the disease. The therapeutic effect will be observed to persist for a period of from 4 to 8 hours after a single application.

Example 1

To a solution of 46 grams of sodium propionate, dissolved in 500 cc. of distilled water, is added a solution of 54 grams of aluminum sulfate dissolved in 500 cc. of distilled water. When all of the aluminum sulfate solution has been added, the mixture is stirred for one-half hour and filtered. A catalytic quantity of propionate acid (0.1 to 5 percent is added and the solution carefully evaporated to a slurry. The slurry is filtered and the insoluble white powder washed twice with 25 cc. portions of cold water containing 0.1 to 0.5 percent of propionic acid and then with one washing of 25 cc. of cold distilled water. The white crystalline powder is dried and corresponds to the formula $C_9H_{15}O_6AL$ containing from 1 to 5 molecules of water of hydration and is aluminum tripropionate. The aluminum tripropionate thus obtained is a stable white powder with a slight aromatic odor and is insoluble in water, but soluble in acid and alkaline solution.

Example 2

A solution of 0.1 mol of aluminum chloride, dissolved in 100 cc. of distilled water is added to a solution of 0.3 mol of sodium propionate dissolved in 100 cc. of water. To this is added 10 cc. of propionic acid and the whole stirred for 1 hour. The water is evaporated and the residue is washed with 100 cc. of distilled water. THe insoluble material is filtered, dried and corresponds to aluminum dipropionate with an empirical formula of $C_6H_{11}O_5Al$ and contains from 1 to 5 molecules of water of hydration. Aluminum dipropionate is a white crystalline powder, insoluble in water but soluble in acid and alkaline solutions.

Example 3

To a solution of 4 mols of calcium propionate dissolved in 1 liter of distilled water, is added a solution of 2 mols of aluminum sulfate dissolved in while hot 1 liter of distilled water. A precipitate of calcium sulfate, aluminum propionate and aluminum dipropionate forms immediately on the addition of the solution of the aluminum compound. The reaction is allowed to proceed to completion at room temperature for one-half hour, after which time the mixture is acidified by the addition of 50 cc. of propionic acid. The mixture is heated and filtered while hot to remove the precipitated calcium sulfate. The solvent is then removed under reduced pressure and the residue dried. The white crystalline powder is aluminum dipropionate and corresponds to the empirical formula $C_6H_{11}O_5Al$ Through the appropriate adjustment of the rations of the reacting materials aluminum tripropionate is obtained. Thus, if a ratio of 6 mols of calcium propionate is caused to react with 2 mols of aluminum sulfate the remainder of the steps being the same as described above, the resulting compound will be aluminum tripropionate corresponding to $C_9H_{15}O_6Al$ Example 4

Aluminum propionate and aluminum dipropionate may be prepared by the direct combination of propionic acid and aluminum hydroxide. Thus, when 1 mol of aluminum hydroxide is caused to react with 3 mols of propionic acid or propionic anhydride, the resultant compound is aluminum tripropionate. When the ratios of reacting components are changed so that 2 mols of aluminum hydroxide are caused to react with 4 mols of propionic acid or propionic anhydride the resulting compound is aluminum dipropionate. When carrying out this reaction a solvent is not necessary, although if desired an inert solvent such as toluene, benzene or xylene may be used. The compound, either aluminum propionate or aluminum dipropionate, is insoluble in this inert solvent and is separated from the reaction media by filtration. Depending upon the ratios of the starting materials used, either aluminum propionate or aluminum dipropionate would be obtained which conforms in every respect to that obtained by the method described in example 1 or 2 above.

Example 5

To a solution of 52.4 grams of citric acid dissolved in 500 cc. of distilled water, is added 47.6 grams of aluminum propionate, in small portions and with constant stirring. Gentle warming may be used to facilitate the reaction, but this is not necessary. When all of the aluminum propionate has been added, the mixture is stirred for 1 hour, or until solution is achieved and hen the water evaporated under reduced pressure. The residue is dissolved in just sufficient hot water (80° to 90° C.), to achieve solution and is set aside in an ice-chest to crystallize. White crystals of double salt of citric acid and aluminum propionate is obtained which corresponds to the formula $AlC_{12}H_{17}O_{11}$ and analyzes for aluminum in good agreement with the theoretical values (theory: 7.40 percent aluminum, found: 7.51 percent aluminum). The crystals are soluble in water, alcohol and glycerin and form a stable homogeneous solutions which may be used in therapy.

Example 6

In place of citric acid used in Example 5 above, there may be substituted stoichiometric equivalents quantities of acetic acid, lactic acid and tartaric acid, and the remainder of the steps of the reaction being the same. The respective double acid salt of aluminum propionate obtained when acetic acid, lactic acid or tartaric acid is used has the following properties:

DOUBLE ACID SALTS OF ALUMINUM PROPIONATE

| Acid component | Empirical formula of double salt | Mol. wt. | Aluminum analysis, percent | | Solubility |
| --- | --- | --- | --- | --- | --- |
| | | | Theory | Found | |
| Acetic acid | $AlC_8H_{13}O_5$ | 232 | 11.1 | 10.8 | Soluble in $H_2O$, alcohol and glycerin. |
| Lactic acid | $AlC_9H_{15}O_7$ | 262.2 | 10.3 | 10.51 | Do. |
| Tartaric acid | $AlC_{10}H_{15}O_{10}$ | 322.19 | 8.37 | 8.10 | Do. |

Example 7

To a solution of 24 parts by weight of lactic acid dissolved in 1 liter of distilled water, is added 76 parts by weight of aluminum dipropionate, in small portions. The mixture is stirred until complete solution has been achieved and then the solvent evaporated under reduced pressure. The residue is dissolved in just sufficient hot water to achieve solution and is set aside to crystallize in an ice chest. White crystals of a double salt of aluminum dipropionate and lactic acid are obtained which analyze in good agreement with the theoretical aluminum value. (Theory: 12.25 percent aluminum; Found 14.71 percent aluminum). The crystals are soluble in water, alcohol and glycerin and form stable, homogeneous solution which may be used in therapy.

Example 8

In place of he lactic acid used in Example 7 above, there may be substituted stoichiometric equivalent quantities of acetic acid, citric acid, or tartaric acid. The remainder of the steps of this reaction being the same. The double acid salt obtained when acetic acid, citric acid, or tartaric acid is used has the following properties:

DOUBLE ACID SALTS OF ALUMINUM DIPROPIONATE

| Double salt empirical formula | Acid component | Mol. wt. | Aluminum analysis, percent | | Solubility |
|---|---|---|---|---|---|
| | | | Theory | Found | |
| Al₂C₁₁H₁₇O₉ | Acetic acid | 347 | 15.5 | 14.96 | Soluble in H₂O, alcohol and glycerin. |
| Al₂C₁₅H₂₂O₁₄ | Citric acid | 480.27 | 11.23 | 10.31 | Do. |
| Al₂C₁₃H₂₀O₁₃ | Tartaric acid | 438.23 | 12.31 | 11.96 | Do. |

Example 9

In place of the solvent described in Examples 1 through 8 above, there may be substituted in the same volumes a liquid alkanol of from 1 through 8 carbons in chain length or an aromatic solvent, as for example, benzene, toluene, or nitrobenzene or acetone or dioxane or chloroforms, or mixtures of these. The remainder of the steps being the same.

When a solvent other than water is being used, then purification of the desired compound may be achieved by dissolving the isolated crude compound in just sufficient hot water to form a solution, allowing the said solution to cool and then diluting the solution with an equal volume of acetone, followed by crystalline material, through filtration and rying, the respective compounds are obtained in substantially pure state.

Example 10

When it is desired to utilize aluminum propionate, aluminum dipropionate, or their double acid salts in the treatment of dermatologic disease they may be prescribed in the form of a solution, lotion, ointment, or dusting powder. The concentration of active ingredients in the desired vehicle is not less than 2 per cent and nor more than 30 per cent by weight. The following range preferred concentration of the active ingredients has been found to be desirable for use in clinical practice to achieve relief of the symptomatology of a variety of dermatologic complaints which are characterized by pruritis, inflammation of the skin, eczematoid lesions and local skin infections.

For special pathologic conditions of he skin, combinations of the appropriate dose forms may be found to be necessary to achieve a desired therapeutic result. Thus, it may be necessary to use the solution as a wet dressing or a soak, one to four times daily with a applications of the dusting powder throughout the rest of the day. The lotion and ointment may be used in a similarly interdependent manner to provide prolonged, intimate contact with the affected area.

The solutions of aluminum propionate, aluminum dipropionate, or their double acid salts are prepared by dissolving the appropriate quantity of the desired active ingredient in water, alcohol, glycerin or combinations of these or other pharmaceutically acceptable carrier, such as Extract of of Witch Hazel. Catalytic quantities of propionic acid (as for example, 0.1 to 0.5 percent are added to achieve solution of the aluminum propionate and aluminum dipropionate and the exact quantity of these to be added will depend upon the pH of the solutions which preferably should be between pH 4 and pH 5. The resultant solution is applied either directly to the affected area or as a wet dressing to the affected area.

If a lotion is desired as the therapeutic dose form, then the active ingredient is incorporated into the aqueous phase, in the desired concentration, in the manner utilized to prepare a solution. The aqueous phase is then emulsified with a nonionic oil-in-water emulsifying agent, as for example, the "Tweens" or the "Pluronics," or any other pharmaceutically suitable nonionic oil-in-water emulsifying agent, with a suitable bland oil. Pharmaceutically acceptable bland oils which may be used for this purpose are the edible vegetable oils, or liquid petrolatum. The range in concentration of the emulsifying agent used for these purposes is from 0.1 to 5.0 percent, while the ratio of the oil phase to the water phase may be from 1:1 to 1:5. Greater or lesser ratios of the oil to water phase may be used depending upon the specific density of the emulsion desired. After the primary emulsion has been formed, the mixture is passed through a homogenizer to form a stable, homogenous pharmaceutically desirable lotion. The lotion is applied to the affected area, several times daily according to the patient's needs.

Ointments are made by the direct dispersion of the powdered crystalline aluminum propionate or aluminum dipropionate, or their double acid salts, in a pharmaceutically acceptable ointment base such as petrolatum, hydrophylic petrolatum or a vanishing cream base. The appropriate quantity (from 2 to 30 percent) of the active ingredient and the base are mixed by trituration or other suitable technique. The ointment is applied to the affected area from one to six times daily depending on the patient's needs.

A dusting powder containing the active ingredient of either aluminum propionate, aluminum dipropionate, or their double acid salts may be prepared by mixing from 2 to 30 percent of the active ingredient with powdered talc, laolin, or any other suitable dusting powder base such as corn starch, oat starch, or potato starch or mixtures of these. Care is to be taken that the mixture is kept dry and the entire powdered mass passed through a No. 60 mesh sieve, several times to insure a uniform particle size dispersion. The dusting powder is applied to the affected area as often as is required to keep the skin dry and in contact with the active ingredient. "It will be found that the optimal concentration of the active ingredients utilized in the preparation of pharmaceutical compositions is not less than 2 percent and not more than 30 percent by weight of the appropriate aluminum propionate double salt selected."

Example 11

When it is desired to inhibit the enzymatic cleavage of urea to ammonia on the surface of the skin, this may be achieved through the application to the skin of aluminum propionate or aluminum dipropionate, or their double acid salts, in the form of a solution, lotion, ointment or dusting powder. A concentration of at least 2 percent of the active ingredients is necessary to inhibit this enzyme system, although larger quantities of the active ingredients may be used in therapy to take advantage of the specific pharmaco-dynamic advantages inherent to these active compounds such as a stringency and antiseptic activity.

Thus when a solution of urea is caused to come in contact with the enzyme urease, at body temperature, a prompt enzymatic degradation of the urea occurs with a consequent shift in the pH of the solution due to the liberation of free ammonia. When any of the active salts such as aluminum propionate, aluminum dipropionate, or their double acid salts are introduced into the enzyme-substrate system, so that a concentration of at leas 2 percent of the aluminum compound is present, this reaction is inhibited and the pH of the solution does not shift to the alkaline range. See FIG. 1, wherein Curve A represents the control condition of a 10 percent solution of urea; Curve B represents such a solution plus 0.1 percent urease; Curve C represents a 10 percent urea solution plus 0.1 percent urease and 2 percent aluminum propionate; and Curve D represents a 10 percent urea solution plus 0.1 percent urease and 2 percent aluminum lactate subpropionate. The curves clearly establish the effective inhibition of urease reaction by compounds of the present invention.

Figure 2:
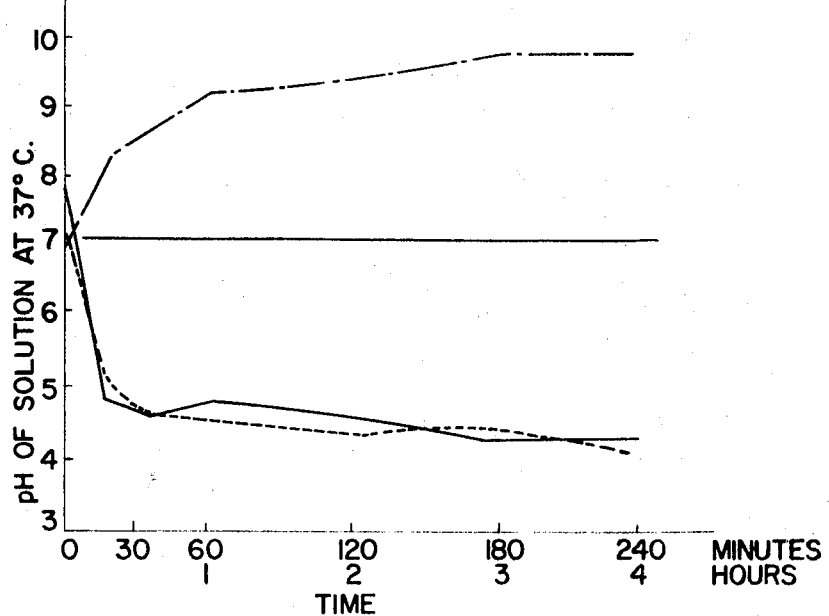

A similar result is observed when an innoculum micro-organisms such as Staphylococcus albus, Staphylococcus aureus, Proteus vulgaris, Sarcina lutea, or E. Coli, is introduced into a medium containing urea. These micro-organisms contain specific enzymes which are capable of converting urea to ammonia. These microbes, moreover, are found on the skins and have been postulated to play an important role in the etiology of diaper rash and other ammonia-induced dermatitudes. Thus, while a control solution of urea and the micro-organisms results in a prompt shift of the pH of the solution the presence of at least 2 percent of the aluminum propionate, aluminum dipropionate or their double acid salts, inhibits this reaction so that no ammonia is liberated and the pH of the solution is maintained on the acid side. See FIG. 2, wherein Curve A represents the control situation, in a 10 percent solution of urea, the pH of which remains unchanged with time; Curve B represents another control situation wherein such solution has had added to 0.2 cc. of a culture of Staph. aureus and E. Coli; Curve C represents the conditions of Curve B plus 2 percent aluminum subpropionate; and Curve D represents the conditions of Curve B plus 2 percent aluminum tartaric propionate. The curves of FIG. 2 clearly evidence the effective inhibition of urea degradation by bacteria by means of the employment of the compounds of the present invention.

Example 12

When it is desired to treat infantile diaper rash or intertrigo in the adult or an inflammatory skin condition complicated by ammonia irritation, then a suitable pharmaceutical dose-form of aluminum propionate, aluminum subpropionate or their double acid salts, may be applied to the effected area from one to six times daily according to the patient's needs. The concentration of active ingredients in these individual dose-forms will range from 2 to 30 percent and the particular concentration selected will depend upon the dose-form chosen. Thus, when an aqueous solution is preferred, the concentration of active ingredients will be from 2 to 10 percent and when an emulsion lotion is desired or an ointment is used as the vehicle, the concentration of active ingredients will be from 2 to 20 percent of active ingredients depending upon the particular carrier which is used as well as the nature of the intended use. Concentrations of active ingredients of at least 2 percent are sufficient to provide a means of inhibiting the conversion of urea to ammonia on the skin surface but this minimal concentration may be increased when other therapeutic properties than the inhibition of the urease enzyme system are desired.

The pH of the skin will be shifted to the acid side promptly after the application of the appropriate dose-form containing the active ingredients and this acid pH will be maintained for as long as 6 hours after a single application.

The individual dose-forms have special advantages for particular therapeutic purposes. THus, it will be found that the ointment and dusting powder will be the preferred preparations for the use and management of pediatric diaper rash as well as to treat the adult forms of intertrigo and other ammoniacal skin irritations. The solution of the active ingredients and the lotion will be preferred for the treatment of local infoammatory skin disease as well as for generalized dermatologic irritations.

It is not desired to be limited except as set forth in the following claims, the above description being by way of illustration of the invention.

What is claimed is:

1. A pharmaceutical composition comprising a pharmaceutically acceptable carrier and not less than 2 percent and not more than 30 percent by weight of aluminum aceto propionate.

2. A pharmaceutical composition comprising a pharmaceutically acceptable carrier and not less than 2 percent and not more than 30 percent by weight of aluminum lacto propionate.

3. A pharmaceutical composition comprising a pharmaceutically acceptable carrier and not less than 2 percent and not more than 30 percent by weight of aluminum citro propionate.

4. A pharmaceutical composition comprising a pharmaceutically acceptable carrier and not less than 2 percent and not more than 30 percent by weight of aluminum tartaro propionate.

5. A pharmaceutical composition comprising a pharmaceutically acceptable carrier and not less than 2 percent and nor more than 30 percent by weight of aluminum aceto dipropionate.

6. A pharmaceutically composition comprising a pharmaceutically acceptable carrier and not less than 2 percent and not more than 30 percent by weight of aluminum citro dipropionate.

7. A pharmaceutical composition comprising a pharmaceutically acceptable carrier and not less than 2 percent and not more than 30 percent by weight of aluminum tartaro dipropionate.

8. A pharmaceutical composition comprising a pharmaceutically acceptable carrier and not less than 2 percent and not more than 30 percent by weight of aluminum lacto dipropionate.

9. A method of treating atopic dermatitis which comprises applying to the skin an effective amount of a composition comprising a pharmaceutically acceptable carrier and not less than 2 percent and not more then 30 percent by weight of a compound selected from the group consisting of aluminum propionate, aluminum dipropionate, aluminum aceto propionate, aluminum citro propionate, aluminum lacto propionate, aluminum tartaro propionate, aluminum aceto dipropionate, aluminum citro dipropionate, aluminum lacto dipropionate, and aluminum tartaro dipropionate.

10. A method of treating dermatologic pruritis which comprises applying to the skin on effective amount of a composition comprising a pharmaceutically acceptable carrier and not less than 2 percent and not more than 30 percent by weight of a compound selected from the group consisting of aluminum dipropionate aluminum aceto propionate, aluminum citro propionate, aluminum lacto propionate, aluminum tartaro propionate, aluminum aceto dipropionate, aluminum citro dipropionate, aluminum lacto dipropionate, and aluminum tartaro dipropionate.

11. A method of treating inflammation of the skin which comprises applying to the skin an effective amount of composition comprising a pharmaceutically acceptable carrier and not less than 2 percent and not more than 30 percent by weight of a compound selected from the group consisting of aluminum propionate, aluminum dipropionate, aluminum aceto propionate, aluminum citro propionate, aluminum lacto propionate, aluminum tartaro propionate, aluminum aceto dipropionate, aluminum citro dipropionate, aluminum lacto dipropionate, and aluminum tartaro dipropionate.

12. A method of treating eczematoid lesions which comprises applying to the skin an effective amount of a composition comprising a pharmaceutically acceptable carrier and not less than 2 percent and not more than 30 percent by weight of a compound selected from the group consisting of aluminum propionate, aluminum dipropionate, aluminum aceto propionate, aluminum citro propionate, aluminum lacto propionate, aluminum tartaro propionate, aluminum aceto dipropionate, aluminum citro dipropionate, aluminum lacto dipropionate, and aluminum tartaro dipropionate.

13. A method of treating local skin infections which comprises applying to the skin an effective amount of a composition comprising a pharmaceutically acceptable carrier and not less than 2 percent and not more than 30 percent by weight of a compound selected from the group consisting of aluminum propionate, aluminum dipropionate, aluminum aceto propionate, aluminum citro propionate, aluminum lacto propionate, aluminum tartaro propionate, aluminum aceto dipropionate, aluminum citro dipropionate, aluminum lacto dipropionate, and aluminum tartaro dipropionate.

14. A method of treating exudative eruptive stages of dermatitides which comprises applying to the skin an effective amount of a composition comprising a pharmaceutically acceptable carrier and not less than 2 percent and not more than 30 percent by weight of a compound selected from the group consisting of aluminum propionate, aluminum dipropionate, aluminum aceto propionate, aluminum citro propionate, aluminum lacto propionate, aluminum tartaro propionate, aluminum aceto dipropionate, aluminum citro dipropionate, aluminum lacto depropionate, and aluminum tartaro dipropionate.

15. A method of treating vesicular eruptive stages of dermatitis which comprises applying to the skin and effective amount of a composition comprising a pharmaceutically acceptable carrier and not less than 2 percent and not more than 30 percent by weight of a compound selected from the group consisting of aluminum propionate, aluminum dipropionate, aluminum aceto propionate, aluminum citro propionate, aluminum lacto propionate, aluminum tartaro propionate, aluminum aceto dipropionate, aluminum lacto dipropionate, aluminum citro dipropionate, and aluminum tartaro dipropionate.

16. A method of treating dermatological fungal infections which comprises applying to the skin and effective amount of a composition comprising a pharmaceutically acceptable carrier and not less than 2 percent and not more than 30 percent by weight of a compound selected from the group consisting of aluminum propionate, aluminum dipropionate, aluminum aceto propionate, aluminum citro propionate, aluminum lacto propinate, aluminum tartaro propionate, aluminum aceto dipropionate, aluminum citro dipropionate, aluminum lacto dipropionate, aluminum tartaro dipropionate.

17. A method of alleviating the symptoms of contact dermatitis which comprises applying to the skin an effective amount of a composition comprising a pharamceutically acceptable carrier and not less than 2 percent and not more than 30 percent by weight of a compound selected from the group consisting of aluminum propionate, aluminum dipropionate, aluminum aceto propionate, aluminum citro propionate, aluminum lacto propionate, aluminum tartaro propionate, aluminum aceto dipropionate, aluminum citro dipropionate, aluminum lacto dipropionate, and aluminum tartaro dipropionate.

18. A method of alleviating the symptoms of allergic dermatitis which comprises applying to the skin and effective amount of a composition comprising a pharmaceutically acceptable carrier and not less than 2 percent and not more than 30 percent by weight of a compound selected from the group consisting of aluminum propionate, aluminum dipropionate, aluminum aceto propionate, aluminum citro propionate, aluminum lacto propionate, aluminum tartaro propionate, aluminum aceto dipropionate, aluminum citro dipropionate, aluminum lacto dipropionate, and aluminum tartaro dipropionate.

19. A method of inhibiting the enzymatic degradation of urea ammonia on skin surfaces which comprises applying to the skin an effective amount of a composition comprising a pharmaceutically acceptable carrier and not less than 2 percent and not more than 30 percent by weight of a compound selected from the group consisting of aluminum propionate, aluminum dipropionate, aluminum aceto propionate, aluminum citro propionate, aluminum lacto propionate, aluminum tartaro propionate, aluminum aceto dipropionate, aluminum citro dipropionate, aluminum lacto dipropionate and aluminum tartaro dipropionate.